US 11,157,328 B2

United States Patent
Matthes

(10) Patent No.: US 11,157,328 B2
(45) Date of Patent: Oct. 26, 2021

(54) DISTRIBUTED PROCESSING QOS ALGORITHM FOR SYSTEM PERFORMANCE OPTIMIZATION UNDER THERMAL CONSTRAINTS

(71) Applicant: INTEL CORPORATION, Santa Clara, CA (US)

(72) Inventor: Katrin Matthes, Biot (FR)

(73) Assignee: INTEL CORPORATION, Santa Clara, CA (US)

( * ) Notice: Subject to any disclaimer, the term of this patent is extended or adjusted under 35 U.S.C. 154(b) by 390 days.

(21) Appl. No.: 16/303,618

(22) PCT Filed: Sep. 14, 2016

(86) PCT No.: PCT/US2016/051724
§ 371 (c)(1),
(2) Date: Nov. 20, 2018

(87) PCT Pub. No.: WO2018/004711
PCT Pub. Date: Jan. 4, 2018

(65) Prior Publication Data
US 2020/0319937 A1     Oct. 8, 2020

(30) Foreign Application Priority Data
Jun. 29, 2016 (EP) .................................. 16305800

(51) Int. Cl.
*G06F 9/50* (2006.01)
*G06F 1/20* (2006.01)
(Continued)

(52) U.S. Cl.
CPC .......... *G06F 9/5094* (2013.01); *G05B 15/02* (2013.01); *G06F 1/20* (2013.01); *G06F 1/32* (2013.01); *G06F 2209/506* (2013.01)

(58) Field of Classification Search
None
See application file for complete search history.

(56) References Cited

U.S. PATENT DOCUMENTS 8,397,088 B1 * 3/2013 Ghose .................. G06F 9/4893
713/300
8,555,283 B2 10/2013 Coskun et al.
(Continued)

FOREIGN PATENT DOCUMENTS

| CN | 104737094 A | * | 6/2015 | ............... | G06F 1/32 |
| CN | 104838330 A | * | 8/2015 | ............... | G06F 1/20 |

(Continued)

OTHER PUBLICATIONS

J. Joven; A. Bagdia; F. Angiolini; D. Castells-Rufas; E. Fernandez-Alonso; J. Carrabina; and G. De Micheli, "QoS-Driven Reconfigurable Parallel Computing for NoC-Based Clustered MPSoCs", Aug. 2013, IEEE Transactions on Industrial Informatics, vol. 9, No. 3. (Year: 2013).*

(Continued)

*Primary Examiner* — Mohammad Ali
*Assistant Examiner* — Kelvin Booker
(74) *Attorney, Agent, or Firm* — Hanley, Flight & Zimmerman, LLC

(57) ABSTRACT

Methods and apparatus for a distributed processing quality of service algorithm for system performance optimization under thermal constraints are disclosed. An example method includes transmitting, at a first time, a first kernel assignment to a system on chip, the first kernel assignment including an indication of a plurality of kernels assigned to a first subsystem of the system on chip, determining, at the first time, a temperature associated with hardware of the system on chip, when the temperature is above a threshold temperature, generating a second kernel assignment including an indication of a first subset of the plurality of kernels assigned to the (Continued)

first sub-system and an indication of a second subset of the plurality of kernels assigned to a second sub-system of the system on chip, and transmitting, at a second time later than the first time, the second kernel assignment to the system on chip.

20 Claims, 7 Drawing Sheets

(51) Int. Cl.
*G06F 1/32* (2019.01)
*G05B 15/02* (2006.01)

(56) References Cited

U.S. PATENT DOCUMENTS

| | | | |
|---|---|---|---|
| 8,996,902 B2* | 3/2015 | Tu | G06F 1/3293 713/323 |
| 9,100,012 B1* | 8/2015 | Chen | G06F 30/34 |
| 9,311,152 B2 | 4/2016 | Miller et al. | |
| 9,330,736 B2* | 5/2016 | Michalak | G06F 12/10 |
| 9,823,673 B2* | 11/2017 | Park | G06F 1/324 |
| 2005/0050373 A1 | 3/2005 | Orenstien et al. | |
| 2007/0088537 A1* | 4/2007 | Lertora | G06F 15/7867 703/28 |
| 2009/0232120 A1* | 9/2009 | Matthes | H04W 16/14 370/342 |
| 2009/0271608 A1* | 10/2009 | Gooding | G06F 1/206 713/100 |
| 2010/0217454 A1 | 8/2010 | Spiers et al. | |
| 2011/0050219 A1* | 3/2011 | Krella | H05K 7/1432 324/251 |
| 2012/0271481 A1* | 10/2012 | Anderson | G06F 1/324 700/299 |
| 2012/0324259 A1* | 12/2012 | Aasheim | G06F 1/329 713/320 |
| 2014/0115363 A1* | 4/2014 | Tu | G06F 1/3293 713/323 |
| 2015/0286257 A1* | 10/2015 | Park | G06F 1/206 361/679.46 |
| 2015/0371355 A1* | 12/2015 | Chen | G06F 9/45533 345/505 |
| 2016/0306410 A1* | 10/2016 | Ghose | G06F 9/5094 |
| 2019/0138481 A1* | 5/2019 | Balle | G06F 13/4027 |

FOREIGN PATENT DOCUMENTS

| | | | | |
|---|---|---|---|---|
| CN | 105009021 A | * | 10/2015 | G06F 1/20 |
| CN | 106170743 A | * | 11/2016 | G06F 1/20 |
| WO | 2013006240 | | 1/2013 | |
| WO | 2016073088 | | 5/2016 | |

OTHER PUBLICATIONS

F. Mulas; M. Pittau; M. Buttu; S. Carta; A. Acquaviva; L. Benini; D. Atienza; and G. De Micheli, "Thermal Balancing Policy for Streaming Computing on Multiprocessor Architectures", Mar. 10-18, 2008, 2008 Design, Automation and Test in Europe. (Year: 2008).*
Shamsa et al., "Goal Formulation: Abstracting Dynamic Objectives for Efficient On-chip Resource Allocation", 2018, IEEE. (Year: 2018).*
Sarma et al., "Cross-layer Virtual/Physical Sensing and Actuation for Resilient Heterogeneous Many-core SaCs", 2016, IEEE. (Year: 2016).*
Sahin et al., "Just Enough is More: Achieving Sustainable Performance in Mobile Devices under Thermal Limitations", 2015, IEEE. (Year: 2015).*
Sahin et al., "QScale: Thermally-Efficient QoS Management on Heterogeneous Mobile Platforms", Nov. 7-10, 2016, ICCAD '16, Austin, TX, USA. (Year: 2016).*
Saadaoui et al., "QoS Modeling Aware Load Balancing in Multiapplication Environment in Network on Chip", Mar. 6-8, 2014, 2014 Information and Communication Technologies Innovation and Application (ICTIA). (Year: 2014).*
Kornaros et al., "A Survey and Taxonomy of On-Chip Monitoring of Multicore Systems-on-Chip", Mar. 2013, ACM Trans. Des. Autom. Electron. Syst. 18, 2, Article 17, 38 pages. (Year: 2013).*
Ahn et al., "Flexible Framework for Dynamic Management of Multi-Core Systems", 2009, IEEE. (Year: 2009).*
European Patent Office, "European Search Report," issued in connection with application No. 16305800.1, dated Dec. 16, 2016, 21 pages.
Fumio Arakawa et al., "Heterogeneous Multicore Processor Technologies for Embedded System," Jan. 1, 2012, Springer-Verlag, New York, p. 202 in Chapter 6, 1 page.
International Searching Authority, "International Search Report and Written Opinion," issued in connection with application No. PCT/US2016/051724, dated Jan. 16, 2017, 11 pages.
European Patent Office, "Communication Pursuant to Article 94(3) EPC", issued in connection with European patent application No. 16305800.1 dated Dec. 19, 2019, 6 pages.
European Patent Office, "Extended Search Report", issued in connection with European patent application No. 16305800.1 dated Dec. 16, 2016, 21 pages.
Furmio Arakawa et al., "Heterogeneous Multicore Processor Technologies for Embedded Systems," p. 202 in Chapter 5: "Application Programs and Systems", published on Jan. 1, 2012, New York, 4 pages.

* cited by examiner

DISTRIBUTED PROCESSING QOS ALGORITHM FOR SYSTEM PERFORMANCE OPTIMIZATION UNDER THERMAL CONSTRAINTS

This patent arises from a national stage of PCT Patent Application No. PCT/US16/51724, entitled "DISTRIBUTED PROCESSING QOS ALGORITHM FOR SYSTEM PERFORMANCE OPTIMIZATION UNDER THERMAL CONSTRAINTS," filed on Sep. 14, 2016, which claims priority to EP Patent Application No. 16305800.1, entitled "DISTRIBUTED PROCESSING QOS ALGORITHM FOR SYSTEM PERFORMANCE OPTIMIZATION UNDER THERMAL CONSTRAINTS," filed on Jun. 29, 2016. Priority to PCT Patent Application No. PCT/US16/51724 and EP Patent Application No. 16305800.1. PCT Patent Application No. PCT/US16/51724 and EP Patent Application No. 16305800.1 are incorporated herein by reference in their entirety.

FIELD OF THE DISCLOSURE

This disclosure relates generally to system performance optimization and, more particularly, to methods and apparatus for a distributed processing quality of service algorithm for system performance optimization under thermal constraints.

BACKGROUND

Computing devices (e.g., computers, smartphones, tablets, televisions, etc.) include multiple processing sub-systems capable of processing workloads having several processing functions (e.g., kernels). Examples of processing sub-systems include a central sub-system, a graphics sub-system, an interconnected sub-system, a digital signal processor, etc. In some examples, the processing sub-systems may process one or more kernels in parallel. In such examples, each processing sub-system processes the one or more kernels assigned to the sub-system.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
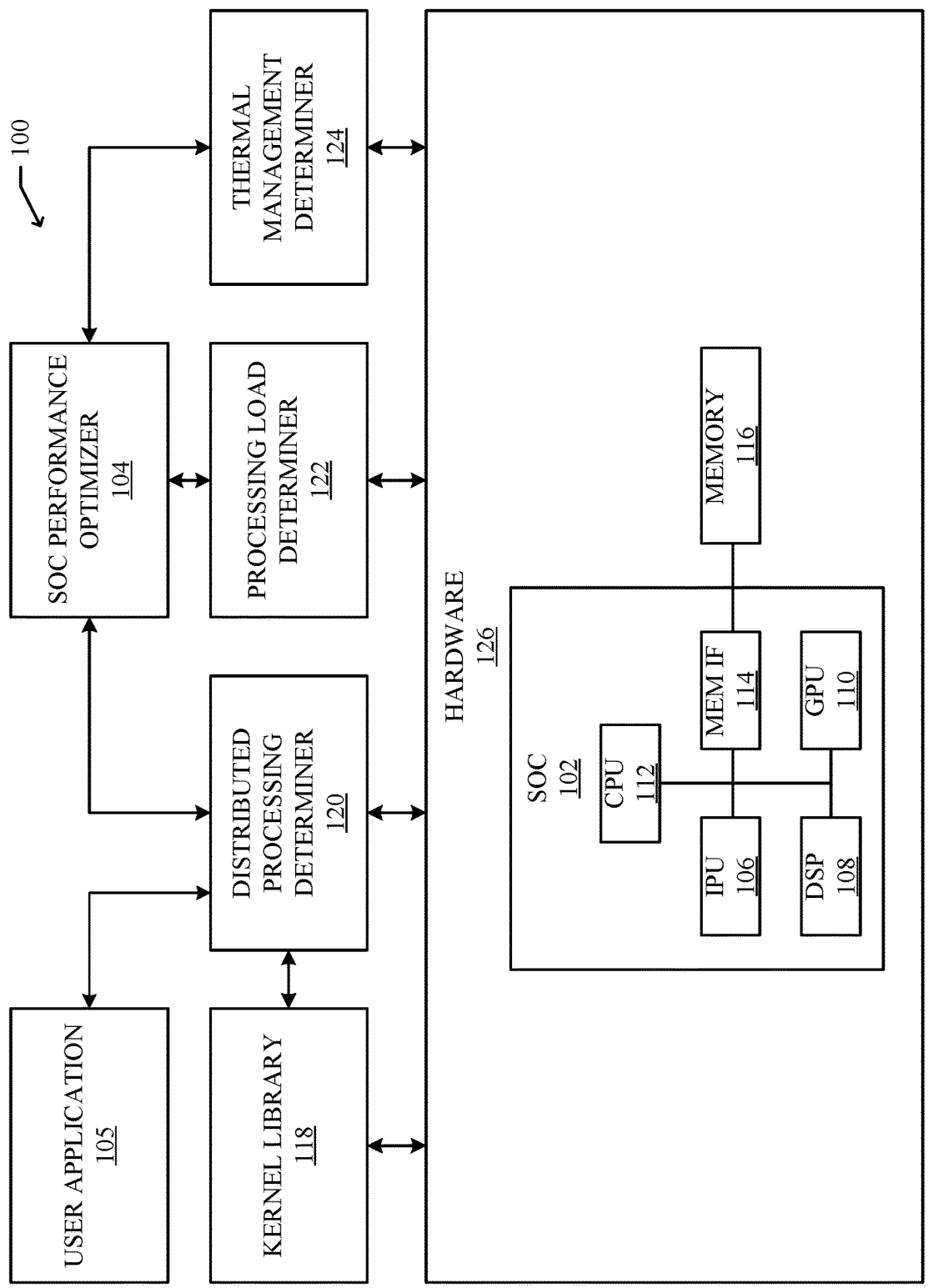
FIG. 1 is an illustration of an example system on chip performance optimizer to optimize performance of sub-systems of an example system on chip.

A system on chip (SOC) is an integrated circuit that integrates components of a computing system on a single chip utilized in high end mobile and portable devices (e.g., smartphones, tablets, phablets, 2in1s, etc.). A system on chip may include various numbers and/or types of sub-systems to execute functions (e.g., kernels) associated with functionality of the SOC. Such sub-systems include, but are not limited to, a central processing unit (CPU), a graphics processing unit (GPU), an interconnected processing unit (IPU), and a digital signal processor (DSP). Each sub-system is structured to execute various kernels. Each kernel is associated with a sub-system of a SOC. In some examples, the association is based on which sub-system can execute the kernel the fastest (e.g., the optimal sub-system for the kernel). Although, there is an optimal (e.g., fastest) sub-system for each kernel, there may be more than one sub-system capable of executing the same kernel.

Some applications may require numerous kernels to be executed by a single sub-system. Execution of numerous kernels for processing intensive applications (e.g., computational photography, augmented reality, computer vision, etc.) on a single sub-system leads to a large increase in temperatures associated with the hardware of the SOC and/or components coupled to the SOC. Operating the hardware at temperatures above a thermal limit of the hardware may cause damage to the SOC or to the device embedding the SOC (e.g., a mobile phone, a tablet, a laptop, 2in1, and/or any other computing device). In some examples, operating the hardware at temperatures above a thermal limit may cause damages to other physical components of the device. For example, the thermal limit may be associated with a temperature (e.g., less than 48 degrees Celsius) of the plastic cover and/or touchscreen of a device (e.g., the skin of the computing device) to prevent the device from being too hot to touch. Examples disclosed herein protect the SOC and other hardware components from such damage by utilizing a quality of service (QoS) algorithm. As used herein, "thermal actors" include any component (e.g., electrical or physical) included in a computing device. For example, thermal actors may include, the SOC, hardware coupled to the SOC, other hardware in the computing device, external components of the computing device (e.g., the screen or backing), and/or any other component associated with the computing device.

Conventional techniques for avoiding a thermal limit include frequency throttling. Frequency throttling includes limiting the maximum frequency of execution (e.g., the computing capacity) that can be used by the sub-system causing the temperature increase. However, frequency throttling substantially limits performance of the computing device. In some examples, frequency throttling in itself cannot prevent the thermal limits from being reached. In such examples, the sub-systems are completely shut down causing errors in the computing device. Examples disclosed herein alleviate such problems by redistribution kernels to balance the loads of the sub-systems.

Examples disclosed herein utilize a QoS algorithm to monitor temperature and loads of each sub-system of the SOC. When the temperature of the SOC and/or hardware coupled or the SOC nears a thermal limit, examples disclosed herein redistribute kernels being operated by subsystems with large loads (e.g., associated with the large temperature increase) to sub-systems with small loads. For example, if a CPU of a SOC is running twenty kernels and the temperature of the hardware is nearing a thermal limit, the example QoS algorithm may distribute a portion of the kernels currently being executed by the CPU to an idle sub-system (e.g., a DSP) that is capable of executing such kernels. In this manner, the load of the CPU decreases causing the temperature to decrease reducing the risk of reaching a thermal limit. In some examples, the QoS algorithm redistributes kernels based on a combination of load and execution speed. For example, if the SOC includes two sub-systems that are idle (e.g., low load), the SOC may determine which of the two sub-systems is capable of executing a kernel fastest to select the most efficient sub-system for the kernel assignment.

Examples disclosed herein poll the SOC to identify the temperature and/or loads associated with the sub-systems of the SOC at various points in time. In some examples, the QoS may increase polling when the risk of a thermal limit is increased. For example, if the measured temperatures are near the thermal limit, the example QoS may increase polling to increase the granularity of the thermal readings. In an alternative example, if the measured temperatures are increasing at a high rate, the example QoS may increase polling to ensure that the QoS can react quickly (e.g., by redistributing kernels) to avoid the thermal limit. In some examples, such as when the measured temperatures are low and/or when the temperature rate of change is low, the example QoS may decrease the polling rate to conserve power.

Examples disclosed herein include an optimal temperature range (e.g., a range between a minimum threshold temperature and a maximum threshold temperature). The optimal temperature range is a range below the thermal limit. The optimal temperature range is the ideal temperature range that the QoS algorithm attempts to operate within while executing processor intensive applications. Examples disclosed herein redistribute kernels in the SOC to balance utilization of the optimal sub-systems within the optimal temperature range to optimize performance without risk of reaching a thermal limit. For example, a QoS algorithm may redistribute half of a first sub-system's kernels to a second sub-system when the maximum threshold temperature is reached. If, in response to the redistribution, the minimum threshold temperature is reached, the QoS algorithm may redistribute a portion of the second sub-system's kernels back to the first sub-system to execute kernels at a temperature within the optimal temperature range. In this manner, the example QoS system converges the temperature to a sustainable temperature (e.g., within the thermal budget of the hardware 126) that balances temperature requirements with execution efficiency. In some examples, the QoS algorithm may redistribute kernels based on several temperate limits (e.g., thermal zones). For example, the QoS algorithm may redistribute a set of kernels from a GPU to a DSP based on a first threshold of a first thermal zone and redistribute from a CPU to the DSP based on a second threshold of a second thermal zone. In some examples, the QoS algorithm may redistribute kernels based on a single temperature limit.

FIG. 1 illustrates an example quality of service (QoS) system 100 to optimize performance of an example SOC 102 through the use of an example SOC performance optimizer 104. The example QoS system 100 includes an example user application 105 to transmit kernels to be executed by the example SOC 102. The example SOC 102 includes an example IPU 106, an example DSP 108, an example GPU 110, an example CPU 112, and an example memory interface (MEM IF) 114 to interface with example memory 116. The example QoS system 100 further includes the example SOC performance optimizer 104, an example kernel library 118, an example distributed processing determiner 120, an example processing load determiner 122, an example thermal management determiner 124, and example hardware 126.

The illustrated example SOC 102 includes four different sub-systems the example IPU 106, the example DSP 108, the example GPU 110, and the example CPU 112 (e.g., sub-systems). Alternatively, the example SOC 102 may include any number and/or type of processors. Each of the example IPU 106, the example DSP 108, the example GPU 110, and the example CPU 112 include hardware and/or software components to implement various kernels (e.g., functions) for the example SOC 102. Each of the example sub-systems 106, 108, 110, 112 is associated with particular kernels (e.g., hardware optimized compute functions). The association may correspond to which sub-system is capable of executing the kernel the fastest (e.g., the optimal sub-system for the kernel). Although each of the example sub-systems 106, 108, 110, 112 is conventionally associated with certain kernels, each of the example sub-systems 16, 108, 110, 112 is capable of executing a variety of kernels. For example, the example CPU 112 may be associated with a particular kernel; however, the example DSP 108 and the example GPU 110 may also be capable of executing the particular kernel. In such examples, the example DSP 108 and/or the example GPU 110 may be utilized to perform the particular kernel when the load of the example CPU 112 is high. The example SOC 102 includes the example MEM IF 114 to retrieve data from the example memory 116. The example memory 116 stores data that may be interfaced with the example SOC 102 via the example MEM IF 114.

The example SOC performance optimizer 104 monitors the example SOC 102 and other components of the example hardware 126 to determine if the loads of the example sub-systems need to be re-balanced. The example SOC performance optimizer 104 monitors thermal indicators to determine when a thermal limit(s) may be reached. When the SOC performance optimizer 104 determines that a thermal limit(s) will be reached, the example SOC performance optimizer 104 identifies the kernels being executed by the example SOC 102 and redistributes the kernels to even out the loads of the example sub-systems of the example SOC 102. For example, the example SOC performance optimizer 104 may determine that the load of the example IPU 106 is high (e.g., the example IPU 106 is executing ten kernels) and the load of the example DSP 108 is low (e.g., idle). In such an example, the SOC performance optimizer 104 may redistribute the 10 kernels such that the example DSP 108 executes five of the ten kernels when a temperature of the example hardware 126 approaches a thermal limit(s). The example SOC performance optimizer 104 continues to monitor the thermal indicators after the redistribution to determine if further redistribution is necessary. In some examples, if the temperature continues to increase additional kernels being executed by the example IPU 106 may be re-distributed. In some examples, if the temperature is lowered below a minimum threshold, any number of the redistributed kernels may be returned to the example IPU 106, as further described in conjunction with FIG. 6A. The example SOC performance optimizer 104 is further described in conjunction with FIG. 2.

The example user application 105 interacts with the distributed processing determiner 120. The user application 105 transmits kernels and/or instructions to the example SOC 102 via the example distributed processing determiner 120 to be executed by the example SOC 102. In some examples, the CPU 112 executes the transmitted instructions. Alternatively, any of the example sub-systems 106, 108, 110, 112 may execute the instructions.

The example kernel library 118 stores all of the kernels that may be executed by the example SOC 102. In some examples, the kernel library 118 includes an association of each kernel to an optimal sub-system. In such examples, the optimal sub-system is the sub-system that executes the kernel the fastest. The example kernel library 118 transmits kernels to the example SOC 102 and the example distributed processing determiner 120.

The example distributed processing determiner 120 interfaces with the example SOC 102 to identify which of the example sub-systems 106, 108, 110, 112 should execute which kernel (e.g., kernel assignments). The example distributed processing determiner 120 determines a mapping to the example sub-systems 106, 108, 110, 112 to determine (A) the optimal sub-system for each kernel (B) which sub-systems are capable of executing each kernel. For example, the distributed processing determiner 120 may determine a mapping to identify that a first kernel is associated with the example GPU 110 and can be executed by the example GPU 110, the example DSP 108, and the example CPU 112. In some examples, the distributed processing determiner 120 determines a sub-system optimization rank (e.g., order) for each stored kernel. For example, a kernel may include a rank with the example CPU 112 listed as first, the example IPU 106 listed as second, and the example GPU 110 listed as third. In such an example, each of the CPU 112, the IPU 106, and the GPU 110 is capable of executing the kernel; however, the example CPU 112 will execute the kernel the fastest, followed by the example IPU 106, and finally the example GPU 110.

The example processing load determiner 122 determines the load of each sub-system 106, 108, 110, 112. In some examples, the processing load determiner 122 transmits a control frequency and/or voltage to the example sub-systems 106, 108, 110, 112. In such examples, the example processing load determiner 122 measures a response to the control frequency and/or voltage to identify the load of each of the example sub-systems 106, 108, 110, 112. In some examples, the processing load determiner 122 utilizes a dynamic voltage and frequency scaling (DVFS) framework to determine the processing loads. Alternatively, any framework may be utilized to determine processing loads.

The example thermal management determiner 124 identifies thermal indicators to measure the temperature(s) of the example hardware 126. The example thermal management determiner 124 polls various thermal sensors on the example hardware 126 to determine the temperature associated with the example hardware 126 (e.g., thermal polling). In some examples, the thermal management determiner 124 may increase the polling rate of the thermal sensors when the temperature approaches the thermal limits based on instructions from the example SOC performance optimizer 104. In some examples, the thermal management determiner 124 may increase the polling rate when the rate of the temperature increase is above a threshold (e.g., set by user and/or manufacture settings). Additionally, the example thermal management determiner 124 may monitor any relevant temperature on a computing device (e.g., when there are multiple thermal limits). For example, the thermal management determiner 124 may measure temperatures associated with the SOC 102, a battery, external memory, a display, a double data rate, non-volatile memory, a plastic and/or metal casing, etc. In some examples, the SOC performance optimizer 104 optimizes performance based on multiple thresholds associated with multiple thermal limits based on the measured temperatures.

Figure 2:
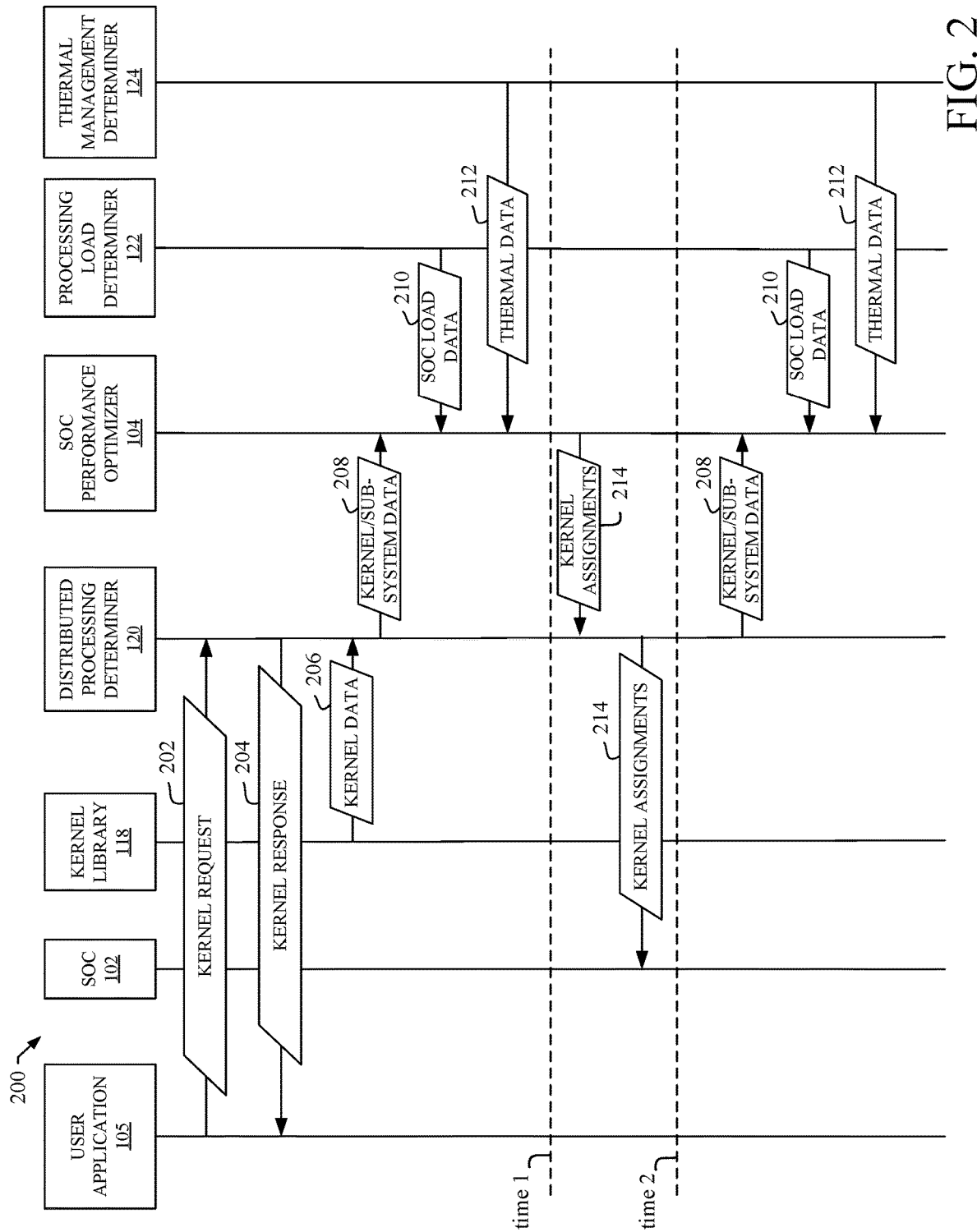
FIG. 2 is an illustration of an example timing diagram illustrating optimization of the example system on chip of FIG. 1.

FIG. 2 is an example timing diagram 200 illustrating an example operation of the quality of service (QoS) system 100 of FIG. 1. The example timing diagram 200 includes the example SOC 102, the example SOC performance optimizer 104, the example user application 105, the example kernel library 118, the example distributed determiner 120, the example processing load determiner 122, and the example thermal management determiner 124 of FIG. 1. The example timing diagram 200 further includes an example kernel request 202, an example kernel response 204, kernel data 206, example kernel/sub-system data 208, example SOC load data 210, example thermal data 212, and example kernel assignments 214.

Initially, the example user application 105 interfaces the example distributed processing determiner 120 to request relevant kernels to be executed by the example SOC 102. In response to receiving the example kernel request 202, the distributed processing determiner 120 transmits the example kernel response 204 including the kernels associated with the example kernel request 202.

The example kernel library 118 transmits the kernel data 206 to the example distributed processing determiner 120. Additionally, the example kernel library 118 transmits the example kernel data 206 whenever the example SOC 102 transmits the example kernel request 202. In this manner, the example distributed processing determiner 120 is always aware of which kernels are currently being executed by the example SOC 102. The example kernel data 206 identifies which kernels are currently being executed by the example SOC 102 based on the example kernel request 202 and kernel response 204. The example distributed processing determiner 120 identifies which of the example sub-systems 106, 108, 110, 112 is capable of executing the kernels currently being executed by the example SOC 102 and/or a sub-system optimization rank associated with each kernel to generate the example kernel/sub-system data 208. The example distributed processor determiner 120 transmits the example kernel/sub-system data 208 to the example SOC performance optimizer 104.

The example processing load determiner 122 transmits SOC load data 210 associated with the load of each of the example sub-systems 106, 108, 110, 112 to the example SOC performance optimizer 104. As previously described in conjunction with FIG. 1, the example processing load determiner 122 determines the processor loads based on load measurements of the example sub-systems 106, 108, 110, 112. Additionally, the example thermal management determiner 124 transmits the example thermal data 212 to the example SOC performance optimizer 104. As described above in conjunction with FIG. 1, the example thermal management determiner 124 monitors thermal sensors to identify temperatures of the example hardware 126. The example processing load determiner 122 transmits the example SOC load data 210 and the example thermal management determiner 124 transmits the example thermal data 212 at set intervals of time to update the example SOC performance optimizer 104. In some examples, the intervals of time are increased when the temperatures near the thermal limits and/or the slope of the temperature measurements is above a threshold. In some examples, the intervals of time are decreased when the temperature is far from the temperature limits and/or when the slope of the temperature measurements is below a threshold. Decreasing the interval (e.g., polling rate) conserves power when the temperature of the example hardware 126 is low.

At time 1, the example SOC performance optimizer 104 determines if the temperatures associated with the example thermal data 212 are nearing the thermal limits. In some examples, the SOC performance optimizer 104 identifies a pattern (e.g., a slope or function) associated with the temperature measures. In such examples, the SOC performance optimizer 104 may predict when the thermal limits will be reached. The example SOC performance optimizer 104 determines the example kernel assignments 214 based on the temperatures and/or the pattern of the temperatures and the SOC load data 210. For example, if the SOC performance optimizer 104 determines that the temperature from the example thermal data 212 is reaching a thermal limit, the example SOC performance optimizer 104 will identify which of the example sub-systems' loads are high and which are low based on the example SOC load data 210. In such an example, the example SOC performance optimizer 104 may redistribute the current kernels running on processors with a high load to processors with a low load.

If the SOC performance optimizer 104 determines that the temperature(s) associated with the thermal limit(s) are not nearing a thermal limit and/or the pattern (e.g., thermal rate of change) of the temperature(s) is not above a threshold, the example SOC performance optimizer 104 maintains the current processor loads and the process repeats at time 2. As described above, the temperature(s) associated with the thermal limits may be one or more temperatures associated with one or more thermal zones. The thermal limits may be associated with the SOC 102, the computing device embedding the SOC 102, and/or any other components (e.g., electrical or physical) associated with the computing device. If the SOC performance optimizer 104 determines that the temperature of the example hardware 126 is reaching the thermal limit and/or the pattern of the temperatures is above the threshold, the example SOC performance optimizer 104 determines which processor should perform each kernel (e.g., the kernel assignments), the SOC performance optimizer 104 transmits the example kernel assignments 214 to the example processing determiner 120. As shown in the illustrated example of FIG. 2, the example distributed processing determiner 120 may transmit the example kernel assignments 214 to the example SOC 102 directly. Alternatively, the example distributed processing determiner 120 may transmit the example kernel assignments 214 to the kernel library 118. In such examples, the kernel library 118 may forward the kernel assignments 214 to the example SOC 102.

At time 2, the example distributed processing determiner 120, the example processing load determiner 122, and the example thermal management determiner 124 continues to transmit the example kernel/sub-system data 208, the example SOC load data 210, and the example thermal data 212 to the example SOC performance optimizer 104. As described above, the SOC performance optimizer 104 continues to monitor the temperatures of the example hardware 126 to determine if/when to redistribute kernels to other processors in the example SOC 102.

Figure 3:
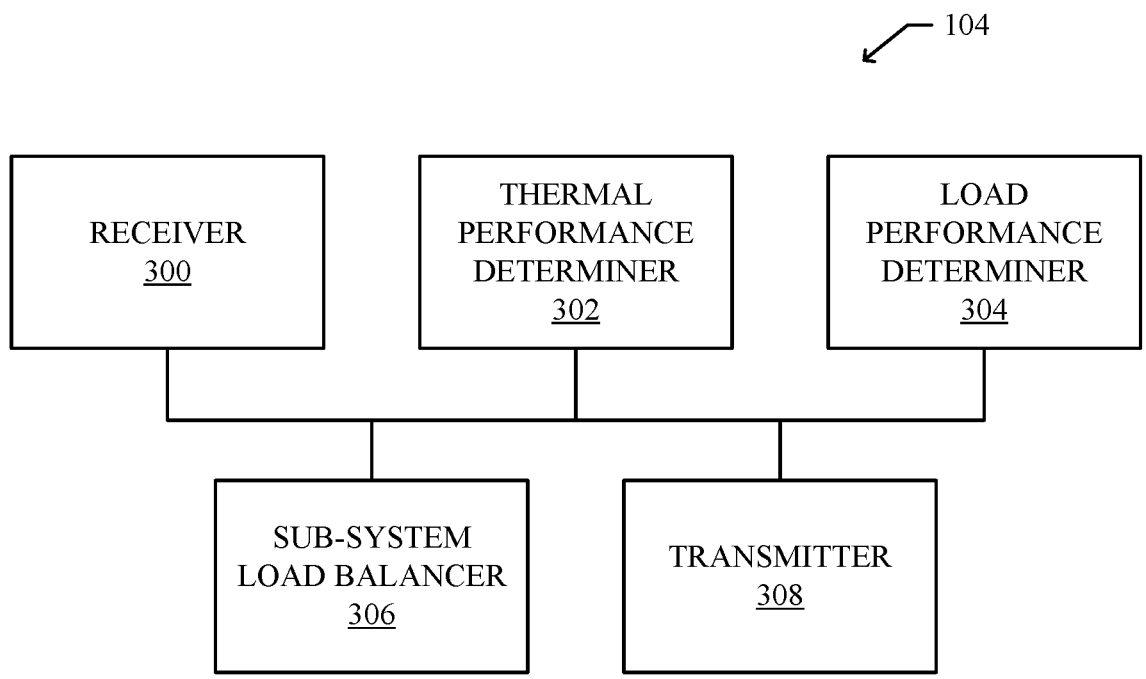
FIG. 3 is a block diagram of an example implementation of the system on chip performance optimizer of FIG. 2.

FIG. 3 is a block diagram of an example implementation for the example SOC performance optimizer 104 of FIG. 1. The example SOC performance optimizer 104 includes an example receiver 300, an example thermal performance determiner 302, an example load performance determiner 304, an example sub-system load balancer 306, and an example transmitter 308.

The example receiver 300 receives the example kernel/sub-system data 208, the example SOC load data 210, and the example thermal data 212 of FIG. 2. As described above, the example kernel/sub-system data 208 includes a mapping and/or order associated with which of the example sub-systems 106, 108, 110, 112 are capable of executing the kernels currently being executed by the SOC 102. The example SOC load data 210 includes data related to the load and/or bandwidth of the example sub-systems 106, 108, 110, 112. For example, the example SOC load data 210 may include a load, a memory bandwidth, power measurements, etc. associated with each of the example sub-systems 106, 108, 110, 112. The example thermal data 212 includes data related to temperature measurements from temperature sensors (e.g., thermistors) associated with the example hardware 126 and/or any other component (e.g., electrical or physical) associated with the computing device.

The example thermal performance determiner 302 determines a thermal performance of the SOC 102 and/or the hardware 126. In some examples, the thermal performance determiner 302 determines how close the received temperatures are to the thermal limits of the SOC 102 and/or the hardware 126. In some examples, the thermal performance determiner 302 compares the current temperatures to temperatures of a prior(s) temperature readings to determine a pattern (e.g., thermal trend or rate of change). For example, if the temperature increase/decrease is linear, the example thermal performance determiner 302 may identify the slope and/or a linear equation for the temperature. In such an example, the example thermal performance determiner 302 may estimate when the temperature will reach the thermal limits based on the slope and/or linear equation and/or what the temperature will be at different points in time. If the temperature increase/decrease is not linear, the example thermal performance determiner 302 may extrapolate a function based on the prior temperature reading(s) to identify when a thermal limit may be reached. In some examples, the thermal performance determiner 302 determines how much to increase the temperature polling rate by based on the thermal trend (e.g., temperature pattern), as further described in conjunction with FIGS. 5 and 6B.

The example load performance determiner 304 determines the load performance of the example SOC 102. The example load performance determiner 304 identifies which of the sub-systems have large loads and which of the sub-systems have small loads and/or are idle. In some examples, the load performance determiner 304 correlate load of a sub-system with memory bandwidth and/or power measurements of the sub-system.

The example sub-system load balancer 306 balances the loads of the example sub-systems 106, 108, 110, 112 based on the thermal performance of the SOC 102 and the load performance of the SOC 102. For example, when the temperatures of the example SOC 102 and/or hardware 114 are nearing a thermal limit and/or when the thermal trend of the temperature is increasing at a rate above a threshold, the example sub-system load balancer 306 determines that the kernels being executed by the example SOC 102 need to be redistributed. As described above, redistributing the kernels balances the loads of the sub-systems 106, 108, 110, 112 of the SOC 102 to lower temperatures associated with a processor executing too many kernels. When the example sub-system load balancer 306 determines that the load of the example sub-systems 106, 108, 110, 112 needs to be rebalanced, the example sub-system load balancer 306 identifies which processors are associated with a large load, and which processors are associated with a small load. The example sub-system load balancer 306 next identifies which of the kernels currently being executed by the processors associated with large loads can be performed by processors with a small load. In some examples, the sub-system load balancer 306 identifies which of the processors of with smaller loads can execute the kernels fastest to optimize the balancing of kernels. For example, if the sub-system load balancer 306 determines that five of the ten kernels currently being executed by the example CPU 112 may be executed by the IPU 106 or the DSP 108, the example sub-system load balancer 306 may analyze the speed of the IPU 106 and the DSP 108 for each of the five kernels. In such an example, if the IPU 106 is faster with regard to the first two kernels and the DSP 108 is faster with regard to the last three kernels, the example sub-system will generate a kernel assignment (e.g., the example kernel assignment 214 of FIG. 2) where the IPU 106 is to execute the first two kernels, the DSP 108 is to execute the last three kernels, and the CPU 112 is to continue executing the remaining five kernels.

The example transmitter 308 transmits the example kernel assignment 214 to the example distributed processing determiner 120. In some examples, the transmitter 308 transmits requests to the example processing load determiner 122 and/or the example thermal management determiner 124 to increase/decrease the polling rate of the example hardware 126.

While example manners of implementing the example SOC performance optimizer 104 of FIG. 1 is illustrated in FIG. 2, elements, processes and/or devices illustrated in FIG. 2 may be combined, divided, re-arranged, omitted, eliminated and/or implemented in any other way. Further, the example receiver 300, the example thermal performance determiner 302, the example load performance determiner 304, the example sub-system load balancer 306, the example transmitter 308, and/or, more generally, the example SOC performance optimizer 104 of FIG. 3 may be implemented by hardware, machine readable instructions, software, firmware and/or any combination of hardware, machine readable instructions, software and/or firmware. Thus, for example, any of the example receiver 300, the example thermal performance determiner 302, the example load performance determiner 304, the example sub-system load balancer 306, the example transmitter 308, and/or, more generally, the example SOC performance optimizer 104 of FIG. 3, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example receiver 300, the example thermal performance determiner 302, the example load performance determiner 304, the example sub-system load balancer 306, the example transmitter 308, and/or, more generally, the example SOC performance optimizer 104 of FIG. 3, is/are hereby expressly defined to include a tangible computer readable storage device or storage disk such as a memory, a digital versatile disk (DVD), a compact disk (CD), a Blu-ray disk, etc. storing the software and/or firmware. Further still, the example SOC performance determiner 104 of FIG. 3 includes elements, processes and/or devices in addition to, or instead of, those illustrated in FIGS. 4 and 5, and/or may include more than one of any or all of the illustrated elements, processes and devices.

Figure 4:
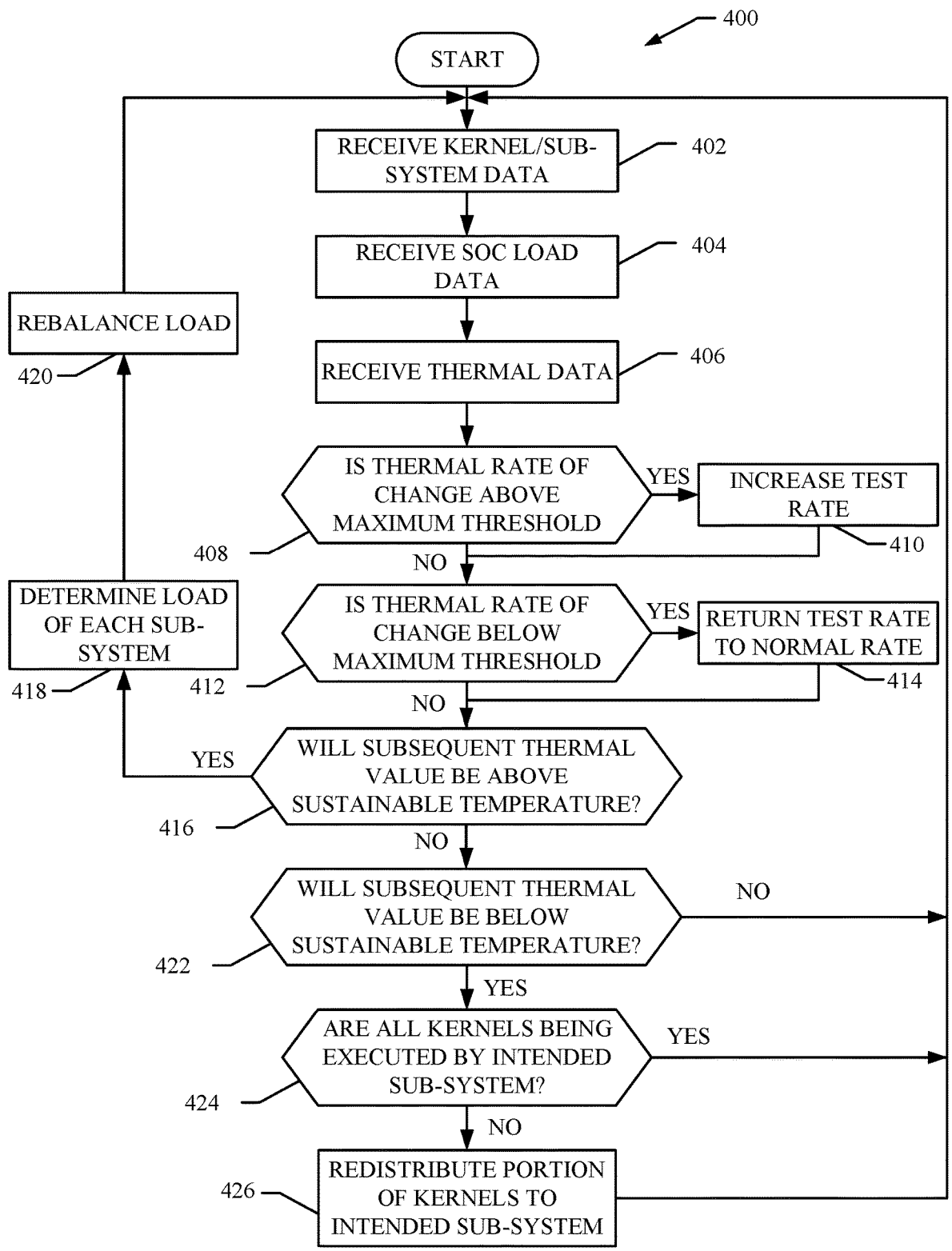
FIGS. 4-5 are flowcharts representative of example machine readable instructions that may be executed to implement the example system on chip performance optimizer of FIG. 3 to optimize performance of the example system on chip of FIG. 1.

A flowchart representative of example machine readable instructions for implementing the example SOC performance optimizer 104 of FIG. 3 is shown in FIGS. 3 and 4. In the examples, the machine readable instructions comprise program(s) for execution by one or more processor(s) such as the processor 712 shown in the example processor platforms 700 discussed below in connection with FIG. 7. The program may be embodied in machine readable instructions stored on a tangible computer readable storage medium such as a CD-ROM, a floppy disk, a hard drive, a digital versatile disk (DVD), a Blu-ray disk, or a memory associated with the processors 712, but the entire program and/or parts thereof could alternatively be executed by a device other than the processors 712 and/or embodied in firmware or dedicated hardware. Further, although the example program is described with reference to the flowcharts illustrated in FIGS. 4 and 5, many other methods of implementing the example SOC performance optimizer 104 of FIG. 3 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a non-volatile memory (NVM), a serial advanced technology attachment (SATA), an embedded multimedia controller (eMMC), a secure digital (SD) memory, a solid state device (SSD) memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is a flowchart 400 representative of example machine readable instructions that may be executed by the example SOC performance optimizer 104 of FIGS. 1-3 to balance loads of the example SOC 102 of FIG. 1. Although the flowchart 400 of FIG. 4 includes an example based on two thresholds based on a temperature measure of one thermal actor, any number and/or type of thresholds may be utilized. For example, the flowchart may monitor multiple thermal limits of multiple thermal actors of a computing device (e.g., the SOC, the display, the plastic and/or metal components, other hardware components in the SOC, etc.).

At block 402, the example receiver 300 receives the example kernel/sub-system data 208 from the example distributed processing determiner 120. As previously described in conjunction with FIG. 2, the example kernel/sub-system data 208 includes a mapping and/or order of which of the example sub-systems 106, 108, 110, 112 are capable of executing the kernels currently being executed by the SOC 102. At block 404, the example receiver 300 receives the example SOC load data 210 from the example processing load determiner 122. As described above in conjunction with FIG. 2, the example SOC load data 210 includes data related to the load of each of the example sub-systems 106, 108, 110, 112. At block 406, the example receiver 300 receives the example thermal data 212 from the example thermal management determiner 124. As described above in conjunction with FIG. 2, the example thermal data 212 includes data related to the temperatures read by thermal sensors on the example hardware 126.

At block 408, the example thermal performance determiner 302 determines if the thermal rate of change is above a maximum rate threshold. For example, the thermal performance determiner 302 calculates a difference between a first temperature read at a first time and a second temperature read at a second time (e.g., a thermal trend). In some examples, the thermal performance determiner 302 may extrapolate a function representative of a thermal trend based on two or more temperature readings at two or more times. The maximum rate threshold may be determined based on user and/or manufacture settings. If the example thermal rate of change is above the maximum threshold, the example thermal performance determiner 302 may instruct the transmitter 308 to transmit instructions to the example thermal management determiner 124 and/or the example processing load determiner 122 to increase the testing (e.g., polling) rate (block 410), as further described in FIG. 5.

At block 412, the example thermal performance determiner 302 determines if the thermal rate of change is below a minimum rate threshold. For example, when the testing rate has been previously increased, the thermal performance determiner 302 may determine that the thermal rate has been lowered (e.g., in response to kernel rebalancing) to a thermal rate of change below the maximum threshold. If the example thermal performance determiner 302 determines that the thermal rate of change is below the maximum threshold, the example thermal performance determiner 302 may instruct the transmitter 308 to transmit instructions to the example thermal management determiner 124 and/or the example processing load determiner 122 to return the testing rate to a normal polling rate (block 414) (e.g., to conserve power).

Figure 6A:
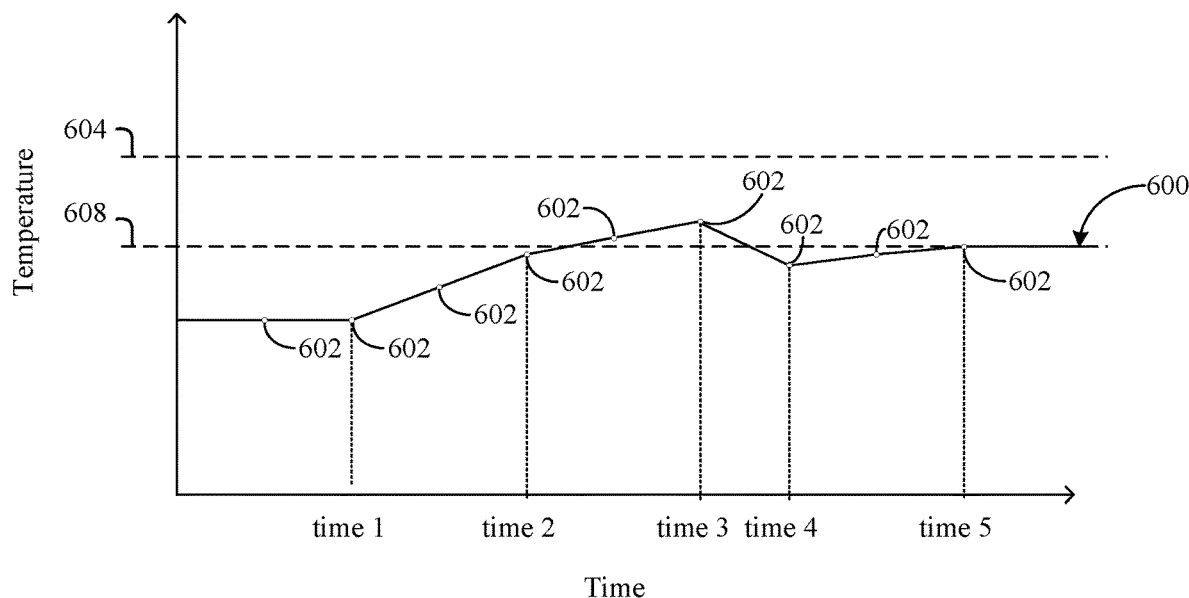
FIGS. 6A and 6B are graphs illustrating temperature measurements taken by an example thermal management determiner to best optimize performance of the example system on chip of FIG. 1.

At block 416, the example thermal performance determiner 302 determines if the subsequent thermal value will be above a sustainable temperature (e.g., the example sustainable temperature 608 of FIG. 6A). The sustainable temperature is an ideal temperature which the example SOC performance optimizer 104 attempts to converge to. In some examples, the sustainable temperature is adjustable. In such examples, the sustainable temperature can be adjusted based on user and/or manufacture preferences. The sustainable temperature is a temperature below the thermal limit of the example SOC 102 and/or the example hardware 126 to provide an error region to re-distribute kernels before the thermal limits are reached. In some examples, the sustainable temperature is a range of temperatures (e.g., 43-46 degrees Celsius). The example thermal performance determiner 302 may determine the subsequent thermal value based on the thermal rate (e.g., applying the thermal rate (e.g., slope) to estimate the next temperate). If the example thermal performance determiner 302 determines that the subsequent thermal value will be above the sustainable temperature, the example load performance determiner 304 determines the load of each sub-system based on the example SOC load data 210 (block 418). For example, the example load performance determiner 304 determines which of the example sub-systems 106, 108, 110, 112 have a large load and which of the example sub-systems 106, 108, 110, 112 have a smaller load.

At block 420, the example sub-system load balancer 306 rebalances the loads of the sub-systems 106, 108, 110, 112 by redistributing the currently executed kernels to the sub-systems with small loads. For example, the example sub-system load balancer 306 may distribute half of the kernels from a sub-system with a large load to a sub-system(s) with a smaller load(s). In some examples, the sub-system load balancer 306 selects sub-systems and/or kernels to be redistributed based on the speed of execution of the kernels by the sub-systems. In some examples, the example sub-system load balancer 306 redistributes the currently executed kernels based on the thermal rate (e.g., redistribute more kernels if the thermal rate is high and less kernels if the thermal rate is low).

At block 422, the example thermal performance determiner 302 determines if the subsequent thermal value will be below the sustainable temperature. As described above, the sustainable temperature and/or sustainable temperature range is the idle temperature(s) that the example SOC performance determiner 104 attempts to converge to. If the thermal value is not below the sustainable temperature, the process repeats. In some examples, before the process repeats, the example sub-system load balancer 306 rebalances the loads of the sub-systems 106, 108, 110, 112 by redistributing the currently executed kernels to the sub-systems with small loads based on the rate of increase in the thermal rate. For example, if there is a continuous positive thermal trend over a predefined duration of time, the sub-system load balancer 306 may rebalance the loads of the sub-systems 106, 108, 110, 112 by redistributing kernels based on the steepness of the thermal rate. In this manner, kernels may be redistributed prior to reaching a sustainable temperature.

If the thermal value is below the sustainable temperature, the example sub-system load balancer 306 determines if all the kernels are being executed by the intended sub-system (block 424). The intended sub-systems are the optimal sub-systems associated with the kernels without taking into account load and/or thermal constraints. If the example sub-system load balancer 306 determines that all the kernels are being executed by the intended sub-systems, the process repeats. If the example sub-system load balancer 306 determines that all the kernels are not being executed by the intended sub-systems, the example sub-system load balancer 306 redistributes a portion of the kernels to the intended sub-systems to optimize performance of the example SOC 102 because thermal constraints are not currently an issue (block 426). In some examples, the sub-system load balancer 306 redistributes a fraction of the kernels being executed by the unintended sub-systems back to the intended sub-systems to ensure that the temperature of the example hardware 126 of FIG. 1 does not rise back to the thermal limits, as further described in conjunction with FIG. 6A.

Figure 5:
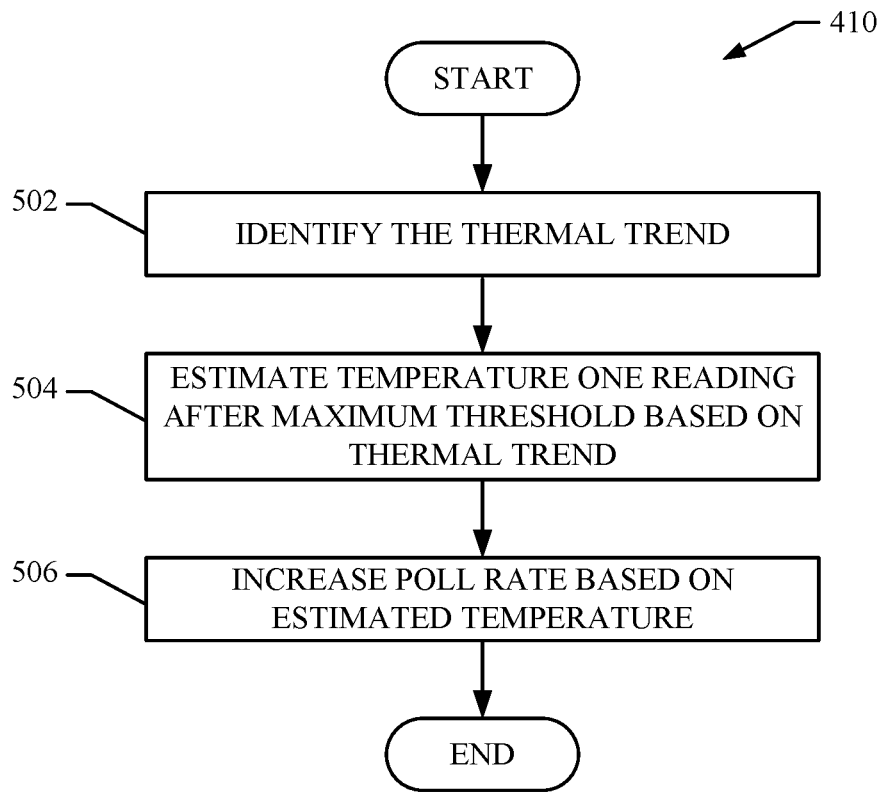

FIG. 5 is a flowchart representative of example machine readable instructions that may be executed to implement the example SOC performance optimizer 104 to increate a test rate as shown in block 410 of FIG. 4.

At block 502, the example thermal performance determiner 302 identifies the thermal trend of the hardware 126 and/or the other thermal actors (e.g., other electrical and/or physical components associated with the hardware 126) based on two or more temperature measurements by the thermal management determiner 124. For example, the thermal performance determiner 302 may identify a pattern (e.g., function) based on the two or more temperature measurements. If the thermal trend is a linear trend, the thermal performance determiner 302 calculates the slope and/or a linear function representative of the thermal trend based on the two or more measurements at two or more moments in time. If the thermal trend is not linear, the example thermal performance determiner 302 extrapolates a function to represent the thermal trend using any extrapolation technique.

At block 504, the example thermal performance determiner 302 estimates a temperature measurement of the example SOC 102 and/or the example hardware 126 and/or other thermal actors one reading after a maximum threshold based on the thermal trend. In some examples, the maximum threshold is the same temperature as the sustainable temperature. Alternatively, the maximum threshold may be any temperature based on user and/or manufacture preferences. In some examples, a thermal limit of the plastic and/or screen of a computing device may be 49 degrees Celsius. In such examples, if the rate of change associated with the plastic and/or screen is 5 degrees every second (e.g., linear), the maximum value threshold is 45 degrees, and the temperature/load polling rate is every second, the example thermal performance determiner 302 will estimate that the temperate one reading after the maximum threshold being 50 degrees (e.g., 45 degree threshold+5 degree change=50 degrees).

At block 506, the example thermal performance determiner 302 increases the poll rate based on the estimated temperature and its relation to the thermal limits. For example, if the estimated temperature (e.g., 50 degrees) is slightly above the thermal limits (e.g., 49 degrees), the example thermal performance determiner 302 may double the polling rate (e.g., twice a second). If the estimated temperature is way above the thermal limits (e.g., 45.5 degrees), the example thermal performance determiner 302 may increase the polling rate by a larger factor (e.g., three, four, five, etc.). Increasing the polling rate ensures that the thermal limits will not be reached at the expense of power consumption. An example of the increased polling rate is described in conjunction with FIG. 6B. In some examples, the thermal performance determiner 302 may increase the polling based on any positive thermal trend.

FIG. 6A is an example graph representative of an example temperature 600 measured by the example thermal management determiner 124 of FIG. 1. The example graph includes the example temperature 600, example polling moments 602, an example thermal limit 604, and an example sustainable temperature 608.

The example temperature 600 is shown as initially stagnate temperature. At this point (e.g., before time 1) no kernels are currently being executed causing the stagnate temperature. At time 1, the example SOC 102 of FIG. 1 begins executing kernels by their intended sub-systems (e.g., the subsystems that execute the kernels fastest). At time 2, the example thermal management determiner 124 measures a temperature from a thermal sensor of the example hardware 126 and/or other thermal actors and determines that the subsequent temperature measurement will be above the example sustainable temperature 608 based on the slope (e.g., thermal rate) of the example temperature 600. Because the temperature trend over a given period of time is projected to be above the example sustainable temperature 608, the example SOC performance optimizer 104 may begin to redistribute kernels from the sub-systems with high loads to the sub-systems with low loads. In some examples, the number of redistributed kernels depends on the slope (e.g., thermal rate) of the example temperature 600. The redistribution of kernels leads to the decrease in the thermal rate from time 2 to time 3. At time 3, the example thermal management determiner 124 determines that the example temperature 600 is above (e.g., substantially above) the sustainable temperature 608 and transmits the example thermal data 212 to the example SOC performance optimizer 104 and the example SOC performance optimizer 104 determines that the temperature 600 is above the example sustainable temperature 608. Additionally, the example SOC performance optimizer 104 identifies, based on the example SOC load data 210 from the example processing load determiner 122, which of the example sub-systems 106, 108, 110, 112 are associated with a high load and which are associated with a small load. The example SOC performance optimizer 104 also receives the kernel/sub-system data 208 from the example distributed processing determiner 120. The example SOC performance optimizer 104 determines which kernels being executed by sub-systems with high loads can be further re-distributed to sub systems with small loads (e.g., the example kernel assignments 214). The example SOC performance optimizer 104 transmits the example kernel assignments 214 to the example distributed processing determiner 120 to instruct the example SOC 102 to redistribute the kernels according to the example kernel assignments 214 (e.g., load balance).

After the loads of the example sub systems 106, 108, 110, 112 have been further rebalanced (e.g., between time 3 and time 4), the example temperature 600 begins to decline. At time 4, the example SOC performance optimizer 104 determines that the example temperature 600 is below the example sustainable temperature 608. As described above, the sustainable temperature 608 and/or a sustainable temperature range is the optimal temperature(s) because it is the temperature(s) where the example sub systems can execute the kernels the most efficiently without risk of reaching the example thermal limit 604. Thus, if the example temperature 600 is below the example sustainable temperature 608 either (A) the example sub systems 106, 108, 110, 112 are not being optimized or (B) the example sub-systems 106,108, 110, 112 are being optimized but the kernels are not causing a temperature increase.

If the example sub-system 106, 108, 110, 112 are not being optimized at time 4 (e.g., the example kernels are not being executed by the intended sub-system), then the example SOC performance optimizer 104 may re-evaluate the kernel assignments 214. Unless there is a change in the number of kernels currently being executed (e.g., associated with a change in the example kernel/sub-system data 208), the example SOC performance optimizer 104 may determine that readjusting all the kernels back to the intended subsystems may necessarily allow the example temperature 600 to increase back over the example sustainable temperature 608. Thus, the example SOC performance optimizer 104 may reallocate a portion of the kernels back to the intended subsystem and allow the previous unintended subsystems to continue to operate the other kernels. For example, initially there may be 8 kernels being executed by the example CPU 112 and 0 kernels being executed by the example IPU 106. In such an example, at time 1, the example SOC performance optimizer 104 may allocate 4 of the 8 kernels to the example IPU 106 (e.g., 4 kernels for the example CPU 112 and 4 kernels for the example IPU 106). At time 2, the example SOC performance optimizer 104 may allocate 2 of the 4 kernels being executed by the example IPU 106 back to the example CPU 112 (e.g., 6 kernels for the example CPU 112 and 2 kernels for the example IPU 106) to attempt to converge the example temperature 600 to the example sustainable temperature 608. Alternatively, the example SOC performance optimizer 104 may return all of the kernels to the intended subsystem.

Figure 6B:
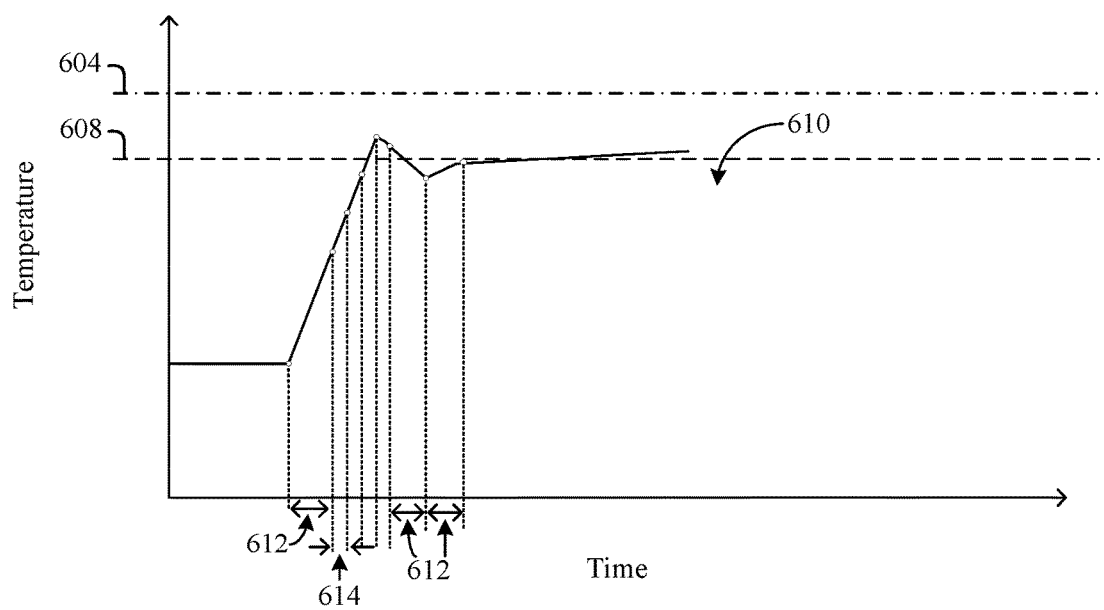

FIG. 6B is an example graph representative of an example temperature 610 measured by the example thermal management determiner 124 of FIG. 1. The example graph includes the example thermal limit 604, and the example sustainable temperature 608 of FIG. 6A. The example graph further includes the example temperature 610 and example polling rates 612, 614. In the example graph of FIG. 6B the example sustainable temperature 608 is a maximum thermal threshold. Alternatively, the maximum thermal threshold may be a second temperature different from the example sustainable temperature 608.

Initially, the example thermal management determiner 124 transmits two temperature readings to the example SOC performance optimizer 104 at the first polling rate 612. After the second temperature reading is received, the example SOC performance optimizer 104 determines the slope of the example temperature 610. As described above in conjunction with FIGS. 4 and 5, if the slope associated with the example temperature 610 is above a rate of change threshold, the example SOC performance optimizer 104 adjusts (e.g., increases) the example polling rate 612. As described above in conjunction with FIG. 5, the example SOC performance optimizer 104 adjusts the example polling rate 612 based on an estimation of a temperature reading one reading after the sustainable temperature 608 (e.g., the maximum thermal threshold). In the illustrated example of FIG. 6B, the example SOC performance optimizer 104 determines that based on the estimation, the example polling rate 612 should be doubled to the second example polling rate 614.

The second example polling rate 614 is utilized until the rate of change decrease to a rate of change below the rate of change maximum threshold. As described above in conjunction with FIG. 4, the example SOC performance optimizer 104 returns the polling rate to the normal rate when the rate of change for the example temperature 610 is below the rate of change maximum threshold to conserve power.

Figure 7:
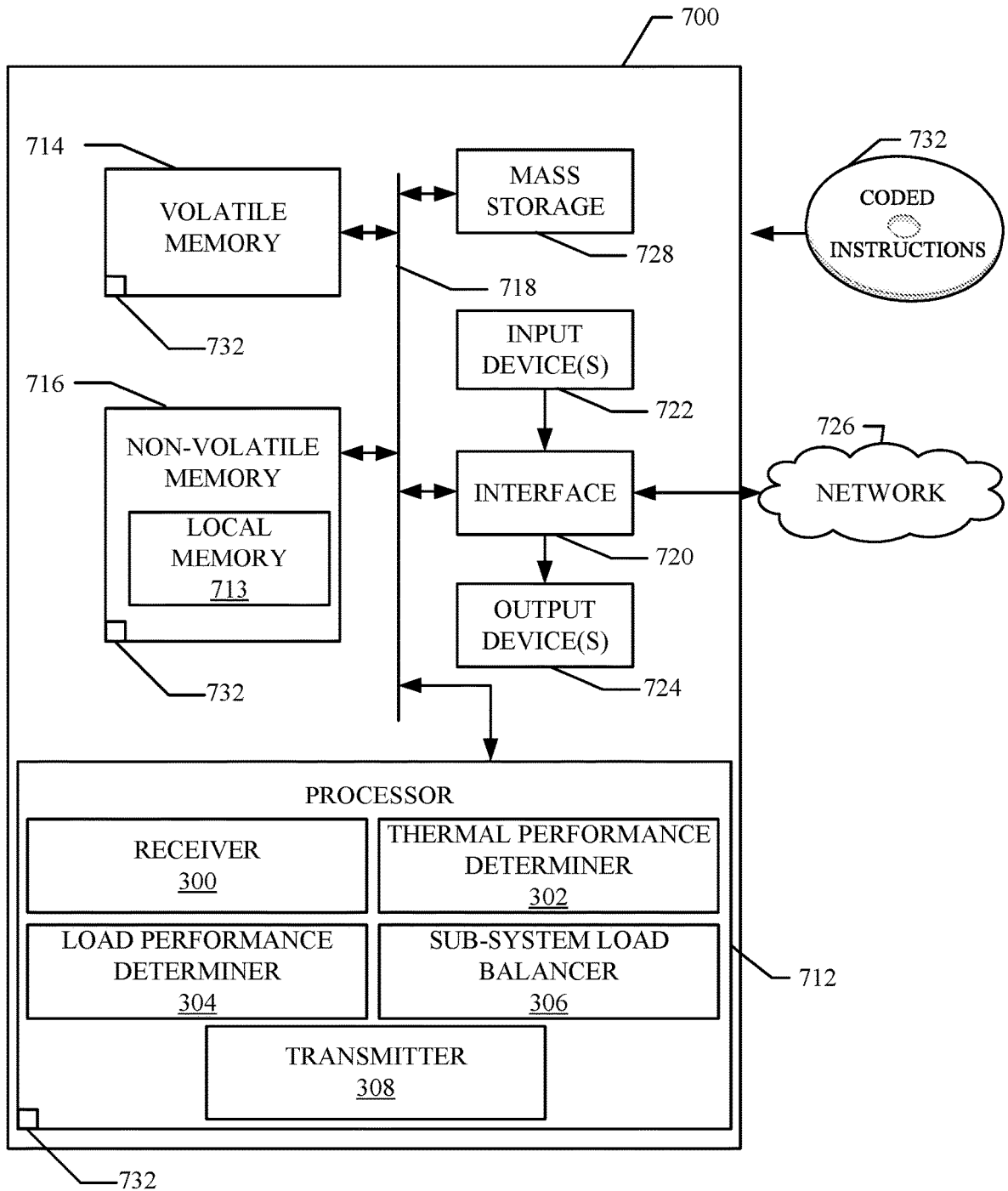
FIG. 7 is a block diagram of a processor platform structured to execute the example machine readable instructions of FIGS. 4-5 to implement the example system on chip performance optimizer of FIG. 3.

FIG. 7 is a block diagram of an example processor platform 700 structured to executing the instructions of FIGS. 3-5 to implement the example SOC performance optimizer 104 of FIGS. 1-3. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes the instructions of FIG. 6 to implement the example receiver 300, the example thermal performance determiner 302, the example load performance determiner 304, the example sub-system load balancer 306, and/or the example transmitter 308 of FIG. 3 to implement the example SOC performance optimizer 104. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory, a serial advanced technology attachment (SATA), an embedded multimedia controller (eMMC), a secure digital (SD) memory, a solid state device (SSD) memory, and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 7 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus, and articles of manufacture have been disclosed for a distributed processing quality of service algorithm for system performance optimization under thermal constraints. As described herein, as the load of a sub-system increases, the temperature associated with the system increases. If the temperature reaches a thermal limit, the system is at risk of damage associated with operating above the thermal limit and/or exceeding temperature norms as part of industry standards (e.g., skin temperature limit less than 48 degrees). In examples disclosed herein, an SOC performance optimizer monitors temperatures associated with an SOC to reduce the risk of reading the thermal limit. When the temperature is above a threshold and/or the rate of temperature change is above a threshold, the SOC redistributes kernels of sub-systems with high loads to sub-systems with low loads, which lowers the system temperature. Conventional techniques to avoid thermal limits associated with high loads in sub-systems include frequency throttling. However, frequency throttling severely hinders performance. Examples disclosed provide thermal limit protection with a significant increase in performance over conventional techniques.

Example 1 is a method comprising transmitting, at a first time, a first kernel assignment to a system on chip, the first kernel assignment including an indication of a plurality of kernels assigned to a first sub-system of the system on chip. Example 1 further includes determining, at the first time, a temperature associated with hardware of the system on chip. Example 1 further includes, when the temperature is above a threshold temperature, generating a second kernel assignment including an indication of a first subset of the plurality of kernels assigned to the first sub-system and an indication of a second subset of the plurality of kernels assigned to a second sub-system of the system on chip. Example 1 further includes transmitting, at a second time later than the first time, the second kernel assignment to the system on chip.

Example 2 includes the subject matter of example 1, further including determining a first load of the first sub-system and a second load of the second sub-systems, wherein, at the first time, the first load is higher than the second load.

Example 3 includes the subject matter of example 2, wherein the transmitting of the second kernel assignment decreases the first load and increases the second load.

Example 4 includes the subject matter of example 1, further including determining, at a third time later than the second time, the temperature associated with the hardware of the system on chip and, when the temperature is below the threshold temperature, generating a third kernel assignment including a portion of the second subset of the kernels being re-assigned to the first sub-system.

Example 5 includes the subject matter of examples 1, 2, 3 or 4, wherein the threshold temperature is a range of temperatures.

Example 6 includes the subject matter of example 4, wherein the temperature is determined by polling of thermal sensors on the system on chip at a first polling rate.

Example 7 includes the subject matter of example 6, further including determining a thermal rate based on the temperature at the first time and the temperature at the third time.

Example 8 includes the subject matter of example 7, further including when the thermal rate is above a threshold rate, changing from the first polling rate to a second polling rate higher than the first polling rate and, when the thermal rate is below the threshold rate, polling the thermal sensors at the first polling rate.

Example 9 includes the subject matter of examples 7 or 8, further including projecting a second temperature based on the thermal rate, when the second temperature is above the threshold temperature, generating a third kernel assignment including an indication of a third subset of the plurality of kernels assigned to the first sub-system and an indication of a fourth subset of the plurality of kernels assigned to a second sub-system of the system on chip, and transmitting the third kernel assignment to the system on chip.

Example 10 includes the subject matter of examples 1, 2, 3, or 9, wherein the transmitting of the second kernel assignment lowers the temperature.

Example 11 includes the subject matter of examples 1, 2, 3 or 9, wherein the first and second kernel assignments cause the system on chip to execute the plurality of kernels based on the first and second kernel assignments.

Example 12 is a an apparatus comprising a transmitter to transmit, at a first time, a first kernel assignment to a system on chip, the first kernel assignment including an indication of a plurality of kernels assigned to a first sub-system of the system on chip. Example 12 further includes a thermal performance determiner to determine, at the first time, a temperature associated with hardware of the system on chip. Example 12 further includes a sub-system load balancer to, when the temperature is above a threshold temperature, generate a second kernel assignment including an indication of a first subset of the plurality of kernels assigned to the first sub-system and an indication of a second subset of the plurality of kernels assigned to a second sub-system of the system on chip. Example 12 further includes the transmitter to transmit, at a second time later than the first time, the second kernel assignment to the system on chip.

Example 13 includes the subject matter of example 12, further including a load performance determiner to determine a first load of the first sub-system and a second load of the second sub-systems, wherein, at the first time, the first load is higher than the second load.

Example 14 includes the subject matter of example 13, wherein the transmitting of the second kernel assignment decreases the first load and increases the second load.

Example 15 includes the subject matter of example 12, wherein the thermal performance determiner to determine, at a third time later than the second time, the temperature associated with the hardware of the system on chip and the sub-system load balancer to, when the temperature is below the threshold temperature, generate a third kernel assignment including a portion of the second subset of the kernels being re-assigned to the first sub-system.

Example 16 includes the subject matter of examples 12, 13, 14, or 15, wherein the threshold temperature is range of temperatures.

Example 17 includes the subject matter of example 15, further including a thermal management determiner to measure the temperature by polling of thermal sensors on the system on chip at a first polling rate.

Example 18 includes the subject matter of example 17, wherein the thermal performance determiner is to determine a thermal rate based on the temperature at the first time and the temperature at the third time.

Example 19 includes the subject matter of example 18, wherein the thermal performance determiner is to, when the thermal rate is above a threshold rate, change from the first polling rate to a second polling rate higher than the first polling rate and, when the thermal rate is below the threshold rate, select the first polling rate.

Example 20 includes the subject matter of examples 18 or 19, wherein the thermal performance determiner is to project a second temperature based on the thermal rate, the sub-system load balancer is to, when the second temperature is above the threshold temperature, generate a third kernel assignment including an indication of a third subset of the plurality of kernels assigned to the first sub-system and an indication of a fourth subset of the plurality of kernels assigned to a second sub-system of the system on chip and the transmitter is to transmit the third kernel assignment to the system on chip.

Example 21 includes the subject matter of examples 12, 13, 14, or 20, wherein the transmitting of the second kernel assignment lowers the temperature.

Example 22 includes the subject matter of examples 12, 13, 14, or 20, wherein the first and second kernel assignments cause the system on chip to execute the plurality of kernels based on the first and second kernel assignments.

Example 23 is an apparatus comprising a first means to transmit, at a first time, a first kernel assignment to a system on chip, the first kernel assignment including an indication of a plurality of kernels assigned to a first sub-system of the system on chip. Example 23 further includes a second means to determine, at the first time, a temperature associated with hardware of the system on chip. Example 23 further includes a third means to, when the temperature is above a threshold temperature, generate a second kernel assignment including an indication of a first subset of the plurality of kernels assigned to the first sub-system and an indication of a second subset of the plurality of kernels assigned to a second sub-system of the system on chip. Example 23 further includes the first means to transmit, at a second time later than the first time, the second kernel assignment to the system on chip.

Example 24 includes the subject matter of example 23, further including a fourth means to determine a first load of the first sub-system and a second load of the second sub-systems, wherein, at the first time, the first load is higher than the second load.

Example 25 includes the subject matter of example 24, wherein the transmission of the second kernel assignment decreases the first load and increases the second load.

Example 26 includes the subject matter of example 23, wherein the second means to determine, at a third time later than the second time, the temperature associated with the hardware of the system on chip and the third means to, when the temperature is below the threshold temperature, generate a third kernel assignment including a portion of the second subset of the kernels being re-assigned to the first sub-system.

Example 27 includes the subject matter of examples 23, 24, 25, or 26, wherein the threshold temperature is range of temperatures.

Example 28 includes the subject matter of examples 26, further including a fifth means to measure the temperature by polling of thermal sensors on the system on chip at a first polling rate.

Example 29 includes the subject matter of example 28, wherein the second means is to determine a thermal rate based on the temperature at the first time and the temperature at the third time.

Example 30 includes the subject matter of example 29, wherein the second means is to, when the thermal rate is above a threshold rate, change from the first polling rate to a second polling rate higher than the first polling rate and, when the thermal rate is below the threshold rate, select the first polling rate.

Example 31 includes the subject matter of examples 29 or 30, wherein the second means is to project a second temperature based on the thermal rate the third means is to, when the second temperature is above the threshold temperature, generate a third kernel assignment including an indication of a third subset of the plurality of kernels assigned to the first sub-system and an indication of a fourth subset of the plurality of kernels assigned to a second sub-system of the system on chip, and the first means is to transmit the third kernel assignment to the system on chip.

Example 32 includes the subject matter of examples 24, 25, 26, or 31, wherein the transmission of the second kernel assignment lowers the temperature.

Example 33 includes the subject matter of examples 24, 25, 26, or 31, wherein the first and second kernel assignments cause the system on chip to execute the plurality of kernels based on the first and second kernel assignments.

Example 34 is a computer readable medium comprising instructions that, when executed, cause a machine to transmit, at a first time, a first kernel assignment to a system on chip, the first kernel assignment including an indication of a plurality of kernels assigned to a first sub-system of the system on chip. Example 34 further includes instructions to determine, at the first time, a temperature associated with hardware of the system on chip. Example 34 further includes instructions to, when the temperature is above a threshold temperature, generate a second kernel assignment including an indication of a first subset of the plurality of kernels assigned to the first sub-system and an indication of a second subset of the plurality of kernels assigned to a second sub-system of the system on chip. Example 34 further includes instructions to transmit, at a second time later than the first time, the second kernel assignment to the system on chip.

Example 35 includes the subject matter of example 34, wherein the instructions cause the machine to determine a first load of the first sub-system and a second load of the second sub-systems, wherein, at the first time, the first load is higher than the second load.

Example 36 includes the subject matter of example 35, wherein the transmission of the second kernel assignment decreases the first load and increases the second load.

Example 37 includes the subject matter of example 34, wherein the instructions cause the machine to determine, at a third time later than the second time, the temperature associated with the hardware of the system on chip and, when the temperature is below the threshold temperature, generate a third kernel assignment including a portion of the second subset of the kernels being re-assigned to the first sub-system.

Example 38 includes the subject matter of examples 34, 35, 36, or 37, wherein the threshold temperature is a range of temperatures.

Example 39 includes the subject matter of example 37, wherein the instructions cause the machine to determine the temperature by polling of thermal sensors on the system on chip at a first polling rate.

Example 40 includes the subject matter of example 39, wherein the instructions cause the machine to determine a thermal rate based on the temperature at the first time and the temperature at the third time.

Example 41 includes the subject matter of example 40, wherein the instructions cause the machine to, when the thermal rate is above a threshold rate, change from the first polling rate to a second polling rate higher than the first polling rate and, when the thermal rate is below the threshold rate, poll the thermal sensors at the first polling rate.

Example 42 includes the subject matter of examples 40 or 41, wherein the instructions cause the machine to project a second temperature based on the thermal rate, when the second temperature is above the threshold temperature, generate a third kernel assignment including an indication of a third subset of the plurality of kernels assigned to the first sub-system and an indication of a fourth subset of the plurality of kernels assigned to a second sub-system of the system on chip, and transmit the third kernel assignment to the system on chip.

Example 43 includes the subject matter of examples 34, 35, 36 or 42, wherein the transmission of the second kernel assignment lowers the temperature.

Example 44 includes the subject matter of examples 34, 35, 36 or 42, wherein the first and second kernel assignments cause the system on chip to execute the plurality of kernels based on the first and second kernel assignments.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a transmitter to transmit, at a first time, a first kernel assignment to a system on chip, the first kernel assignment including an indication of a plurality of kernels assigned to a first sub-system of the system on chip;
    a thermal performance determiner to:
        determine a first temperature associated with hardware of the system on chip at the first time;
        determine a thermal rate based on the first temperature and a second temperature, the second temperature associated with the hardware at a second time prior to the first time;
        estimate a subsequent temperature for the hardware based on the thermal rate;
    a sub-system load balancer to, when the estimated subsequent temperature is above a threshold temperature, generate a second kernel assignment including an indication of a first subset of the plurality of kernels assigned to the first sub-system and an indication of a second subset of the plurality of kernels assigned to a second sub-system of the system on chip; and
    the transmitter to transmit, at a third time later than the first time, the second kernel assignment to the system on chip.

2. The apparatus of claim 1, further including a load performance determiner to determine a first load of the first sub-system and a second load of the second sub-system, wherein, at the first time, the first load is higher than the second load.

3. The apparatus of claim 2, wherein the transmitting of the second kernel assignment decreases the first load and increases the second load.

4. The apparatus of claim 1, wherein:
    the thermal performance determiner to determine, at a fourth time later than the second time, a third temperature associated with the hardware of the system on chip; and
    the sub-system load balancer to, when the third temperature is below the threshold temperature, generate a third kernel assignment including a portion of the second subset of the kernels being re-assigned to the first sub-system.

5. The apparatus of claim 4, wherein the threshold temperature is range of temperatures.

6. The apparatus of claim 4, further including a thermal management determiner to measure the third temperature by polling of thermal sensors on the system on chip at a first polling rate.

7. The apparatus of claim 1, wherein the thermal performance determiner is to:
    when the thermal rate is above a threshold rate, change from a first temperature polling rate to a second temperature polling rate higher than the first temperature polling rate; and
    when the thermal rate is below the threshold rate, select the first temperature polling rate.

8. The apparatus of claim 1, wherein the transmitting of the second kernel assignment lowers the temperature.

9. The apparatus of claim 1, wherein the first and second kernel assignments cause the system on chip to execute the plurality of kernels based on the first and second kernel assignments.

10. A method comprising:
    transmitting, at a first time, a first kernel assignment to a system on chip, the first kernel assignment including an indication of a plurality of kernels assigned to a first sub-system of the system on chip;
    determining a first temperature associated with hardware of the system on chip at the first time;
    determining a thermal rate based on the first temperature and a second temperature, the second temperature associated with the hardware at a second time prior to the first time;
    estimating a subsequent temperature for the hardware based on the thermal rate;
    when the estimated subsequent temperature is above a threshold temperature, generating a second kernel assignment including an indication of a first subset of the plurality of kernels assigned to the first sub-system and an indication of a second subset of the plurality of kernels assigned to a second sub-system of the system on chip; and
    transmitting, at a third time later than the first time, the second kernel assignment to the system on chip.

11. The method of claim 10, further including determining a first load of the first sub-system and a second load of the second sub-system, wherein, at the first time, the first load is higher than the second load.

12. The method of claim 10, further including:
    when the thermal rate is above a threshold rate, changing from a first temperature polling rate to a second temperature polling rate higher than the first temperature polling rate; and
    when the thermal rate is below the threshold rate, selecting the first temperature polling rate.

13. A computer readable medium comprising one or more instructions that, when executed, cause a machine to:
    transmit, at a first time, a first kernel assignment to a system on chip, the first kernel assignment including an indication of a plurality of kernels assigned to a first sub-system of the system on chip;
    determine a first temperature associated with hardware of the system on chip at the first time;
    determine a thermal rate based on the first temperature and a second temperature, the second temperature associated with the hardware at a second time prior to the first time;
    estimate a subsequent temperature for the hardware based on the thermal rate;
    when the estimated subsequent temperature is above a threshold temperature, generate a second kernel assignment including an indication of a first subset of the plurality of kernels assigned to the first sub-system and an indication of a second subset of the plurality of kernels assigned to a second sub-system of the system on chip; and transmit, at a third time later than the first time, the second kernel assignment to the system on chip.

14. The computer readable medium of claim 13, wherein the instructions cause the machine to determine a first load of the first sub-system and a second load of the second sub-systems, wherein, at the first time, the first load is higher than the second load.

15. The computer readable medium of claim 14, wherein the transmission of the second kernel assignment decreases the first load and increases the second load.

16. The computer readable medium of claim 13, wherein the threshold temperature is range of temperatures.

17. The computer readable medium of claim 13, wherein the instructions cause the machine to measure the first temperature by polling of thermal sensors on the system on chip at a first polling rate.

18. The computer readable medium of claim 13, wherein the instructions cause the machine to:
when the thermal rate is above a threshold rate, change from a first temperature polling rate to a second temperature polling rate higher than the first temperature polling rate; and
when the thermal rate is below the threshold rate, select the first temperature polling rate.

19. The computer readable medium of claim 13, wherein the transmitting of the second kernel assignment lowers the temperature.

20. The computer readable medium of claim 13, wherein the first and second kernel assignments cause the system on chip to execute the plurality of kernels based on the first and second kernel assignments.

* * * * *